(12) United States Patent
Alfke et al.

(10) Patent No.: US 6,204,695 B1
(45) Date of Patent: Mar. 20, 2001

(54) CLOCK-GATING CIRCUIT FOR REDUCING POWER CONSUMPTION

(75) Inventors: Peter H. Alfke, Los Altos Hills; Alvin Y. Ching, San Jose; Scott O. Frake, Cupertino; Jennifer Wong, Fremont; Steven P. Young, San Jose, all of CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 09/336,357

(22) Filed: Jun. 18, 1999

(51) Int. Cl.[7] .................................................. H03H 19/096
(52) U.S. Cl. ............................................... 326/93; 327/141
(58) Field of Search ................................ 326/93; 327/141

(56) References Cited

U.S. PATENT DOCUMENTS 5,537,062 * 7/1996 Mote, Jr. ................................ 326/93

* cited by examiner

Primary Examiner—David Nelms
Assistant Examiner—M. Tran
(74) Attorney, Agent, or Firm—Julie Stephenson; Lois D. Cartier

(57) ABSTRACT

A clock gating circuit is provided for a logic device that reduces device resource requirements, eliminates the need for users to define their own clock gating circuit, and eliminates undesirable clock signal disturbances, such as glitches and runt pulses. In one embodiment, the clock gating circuit includes an input terminal for receiving an input clock signal; an input terminal for receiving a clock enable signal; a storage latch coupled to receive the input clock signal and the clock enable signal, and in response, provide a clock gate control signal; and a logic gate coupled to receive the input clock signal and the clock gate control signal. The logic gate selectively routes the input clock signal in response to the clock gate control signal, thereby providing an output clock signal.

8 Claims, 5 Drawing Sheets

CLOCK-GATING CIRCUIT FOR REDUCING POWER CONSUMPTION

FIELD OF THE INVENTION

The present invention relates to a user-defined logic device. More specifically, the present invention relates to a circuit for reducing power consumption within a user-defined logic device.

BACKGROUND OF THE INVENTION

The timing of events is key to proper processing within user-defined logic devices. Accordingly, a single clock is used as a reference to determine the timing of events. Each process may be clocked from a single distributed clock signal, providing highly synchronized processing.

However, not all processes are active at all times. Therefore, some processes do not require a continuous clock signal. Continuously providing the primary clock signal to a process that does not require such adds unnecessarily to the power consumption of the chip. A significant cause of power consumption within a user-defined logic device is the power required to distribute the primary clock signal throughout the chip.

To lessen this power consumption, some users of user-defined logic devices utilize a portion of the resources of the logic device to "gate" the primary clock. A clock is gated when the regular clock pulse waveform is translated to a constant value output. For example, when a primary clock signal has a traditional square waveform, the gated clock signal has a constant logic value (e.g., a constant logic low value). Because the power required to provide a constant logic value to a process is less than the power required to provide a square waveform, the power consumption of the chip is reduced.

User-defined logic device resources typically use individual clock enable (CE) controls to control flip-flops and registers. These individual clock enable controls can be used to implement clock gating circuitry within the logic of the user-defined logic device. However, this method of gating the clock signal undesirably requires utilization of core logic resources of the user-defined logic device to form these clock enable controls.

Because flip-flops and registers respond to either the rising or falling edge of a clock signal, it would be desirable to have control over the state of the gated clock signal. Control over the state of the gated clock signal provides a user with control of the state of the flip-flops and registers receiving the gated clock signal. Thus, it would be desirable to control the logic value of the gated clock signal.

The high power consumption of a continuously running clock forces many users to create their own circuits to gate the global clock. This means that many users create their own methods of suspending the clock signal to a process to prevent the power consumption caused by the unnecessary provision of the primary clock to that process. These user-created methods can yield undesirable effects including glitches and runt pulses in the gated clock signal.

It would therefore be desirable to have a clock gating circuit for a user-defined logic device that does not consume large amounts of device resources, provides user control over the logic value of the gated clock, eliminates the need for users to define their own clock gating circuit, and eliminates undesirable clock signal disturbances, such as glitches and runt pulses.

SUMMARY

In one embodiment of the present invention, a programmable logic device includes an array of programmable logic resources, such as configurable logic blocks, and a dedicated clock gating circuit. The dedicated clock gating circuit is preferably located outside of the array of configurable logic blocks. For example, the dedicated clock gating circuit can be located at the periphery of the programmable logic device. In one embodiment, the clock gating circuit includes a storage latch that is configured to receive an input clock signal and a clock enable signal. The storage latch is configured to generate a control signal in response to the input clock signal and the clock enable signal. This control signal is used to control the gating of the input clock signal, such that a glitch-free and runt-free output clock signal is generated.

In accordance with a method of the present invention, the storage latch operates as follows to generate the control signal.

When the input clock signal is in a first logic state, the storage latch provides a control signal representative of the clock enable signal. If the state of the clock enable signal changes while the input clock signal is in the first logic state, then the control signal changes to reflect this change in the clock enable signal. In one example, if the input clock signal is in a logic low state, then the control signal has the same logic state as the clock enable signal. A logic high clock enable signal therefore results in a logic high control signal. If the clock enable signal goes low, then the control signal also goes low.

When the input clock signal transitions from the first logic state to a second logic state, the value of the clock enable signal is latched into the storage latch. This value of the clock enable signal remains latched in the storage latch as long as the input clock signal remains in the second logic state. During this time, the control signal provided by the storage latch is representative of the clock enable signal latched in the storage latch. Thus, even if the clock enable signal changes while the input clock signal is in the second logic state, the control signal does not change during this time. For example, if the clock enable signal has a logic low value when the input clock signal transitions from a logic low state to a logic high state, the logic low clock enable signal is latched in the storage latch. This logic low signal is provided as the control signal. As long as the input clock signal remains in the logic high state, the control signal maintains the logic low value, regardless of any changes in the clock enable signal.

The control signal is used to control the gating of the input clock signal. For example, the control signal can be logically ANDed with the input clock signal to create an output clock signal. The output clock signal is then routed throughout the programmable logic device.

The manner in which the control signal is generated advantageously ensures that the output clock signal does not exhibit glitches or runt pulses.

DETAILED DESCRIPTION OF THE DRAWINGS

In light of the deficiencies of current methods for reducing power consumption from a continuously running clock, it would be desirable to provide an on-chip clock gate, so that users can avoid the extra delay and potential glitches from user-created clock gating circuits. Accordingly, the present invention provides a dedicated on-chip clock gating circuit.

Figure 1:
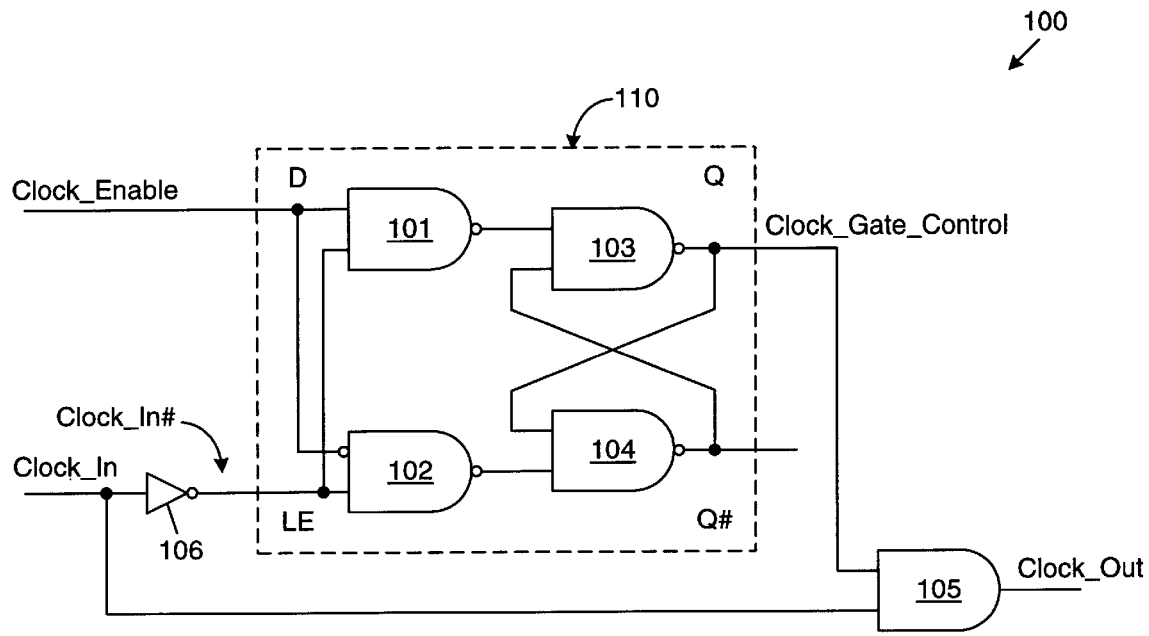
FIG. 1 is a schematic diagram of a clock gating circuit in accordance with one embodiment of the present invention.

FIG. 1 is a schematic diagram of clock gating circuit 100 in accordance with one embodiment of the present invention. FIG. 1 includes NAND gates 101–104, AND gate 105 and inverter 106, which are interconnected as follows. Inverter 106 is coupled to receive a Clock_In signal. The Clock_In signal is the continuously running system clock. NAND gate 101 is coupled to receive a Clock_Enable signal and the inverse of the Clock_In signal (i.e., the Clock_In# signal) from the output terminal of inverter 106. The Clock_Enable signal enables and disables the Clock_In signal. The Clock_In and Clock_Enable signals are provided by the general interconnect structure of the user-defined logic device. NAND gate 102 is coupled to receive the inverse of the Clock_Enable signal and the Clock_In# signal. NAND gate 103 is coupled to receive the output signal of NAND gate 101 and the output signal of NAND gate 104. NAND gate 104 is coupled to receive the output signal of NAND gate 102 and the output signal of NAND gate 103. NAND gates 101–104 are cross-coupled to form storage latch 110.

Storage latch 110 includes a latch enable (LE) terminal, a data input (D) terminal, a data output (Q) terminal, and an inverse data output (Q#) terminal, as illustrated. As shown, storage latch 110 receives the Clock_Enable signal at the data input (D) terminal and the inverse of the Clock_In signal, Clock_In#, from inverter 106 at the latch enable (LE) terminal. The Clock_Gate_Control signal is provided at the data output (Q) terminal of storage latch 110, and corresponds to the output signal of NAND gate 103. The inverse data output (Q#) terminal provides a signal value that is the inverse of the signal value provided by the data output (Q) terminal. The signal value provided at the inverse data output (Q#) terminal of storage latch 110 is not used in clock gating circuit 100.

AND gate 105 is coupled to receive the Clock_Gate_Control signal from storage latch 110 at a first input terminal and the Clock_In signal at a second input terminal. The Clock_Out signal is defined as the output signal of AND gate 105. The Clock_Out signal is therefore the gatable clock signal, which may be used for a process that does not require a continuously running clock. A gatable clock signal is a signal that may be controlled to either follow an input clock signal (e.g., the Clock_In signal) or gate the input clock signal (e.g., maintain a constant logic value).

In one embodiment, the Clock_In signal is received on an input pad of the user-defined logic device. The Clock_Out signal is a global clock signal used by the user-defined logic device. Both the Clock_In and Clock_Out signals are available for use within the user-defined logic device. Clock gating circuit 100 is implemented for each global clock input on the user-defined logic device and is activated by configuration memory cell bits. Clock gating circuit 100 is located at the periphery of the user-defined logic device (e.g., at the four corners of the device) and is not part of the core programmable logic of the device (e.g., not in the configurable logic block array). Thus, any process requiring a synchronous system clock receives either the continuous Clock_In system clock signal or the gatable Clock_Out signal, depending on the requirements of each process. In a particular embodiment, clock gating circuit 100 is transparent when not activated. In this particular embodiment, the Clock_Out signal follows the Clock_In signal with only one gate delay being added by clock gating circuit 100.

The operation of clock gating circuit 100 is now described. Storage latch 110 stores the last logic value of the signal provided to the data input (D) terminal (e.g., the Clock_Enable signal) when the signal provided to the latch enable (LE) terminal (e.g., the Clock_In# signal) has a logic low value. Because the Clock_In# signal is the inverse of the Clock_In signal, storage latch 110 stores the last logic value of the Clock_Enable signal when the Clock_In signal has a logic high value. Storage latch 110 passes the logic value of the Clock_Enable signal when the Clock_In signal has a logic low value.

For example, when the Clock_In signal has a logic low value, the Clock_Gate_Control signal is equal to the logic value of the Clock_Enable signal. Thus, the output signal of storage latch 110 is the current logic value of the Clock_Enable signal, e.g., a logic low value. If the Clock_Enable signal transitions to a logic high value while the Clock_In signal has a logic low value, then the Clock_Gate_Control signal also transitions to a logic high value.

When the Clock_In signal transitions to a logic high value, the Clock_Gate_Control signal is latched at its current value and remains at this value as long as the Clock_In signal remains high. In the example above, the Clock_Gate_Control signal has a logic low value when the Clock_In signal transitions to a logic high value. Thus, the Clock_Gate_Control signal is latched at this logic low value for as long as the Clock_In signal remains high. Under these conditions, the Clock_Gate_Control signal remains at a logic low value even if the Clock_Enable signal transitions to a logic high value.

The Clock_Enable signal is active high. This means that the Clock_Enable signal is asserted high in order to enable the Clock_In signal to be passed as the Clock_Out signal. As can be seen from FIG. 1, the Clock_Out signal is equivalent to the Clock_In signal ANDed with the output signal, Clock_Gate_Control, of storage latch 110.

Figure 2:
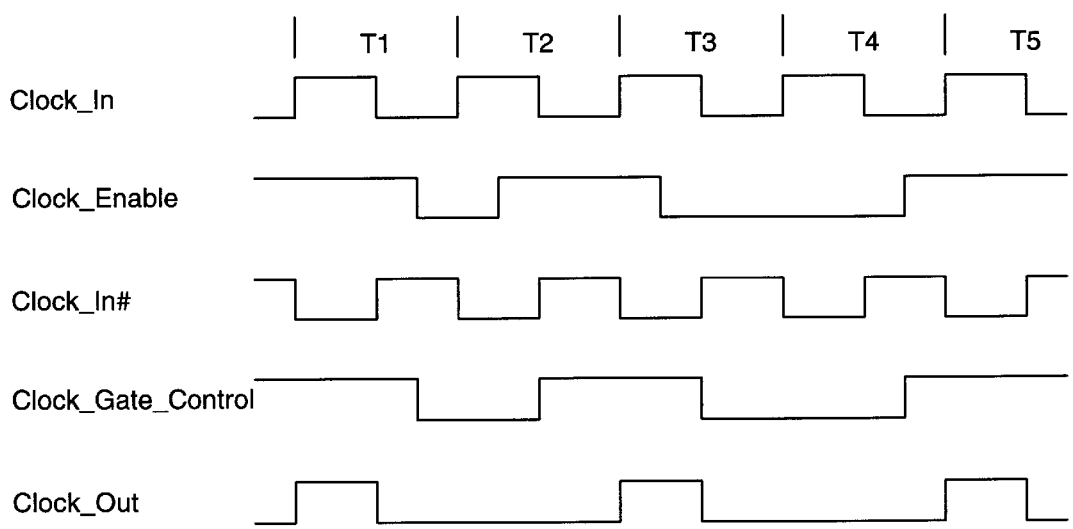
FIG. 2 is a waveform diagram of the timing signals of the clock gating circuit of FIG. 1.

FIG. 2 is a waveform diagram illustrating the signal timing of clock gating circuit 100 of FIG. 1. Note that signal delays are not represented in this diagram. As described, the circuit of FIG. 1 is rising edge triggered. The rising edge is the location in a clock cycle where the clock signal transitions from a logic low value to a logic high value. Thus, the circuit output signal (Clock_Out) changes in accordance with the conditions present at the rising edge of the Clock_In signal. When the clock is not gated (i.e., when the Clock_Gate_Control signal is high), the Clock_Out signal follows the Clock_In signal. When the clock is gated (i.e., when the Clock_Gate_Control signal is low), the Clock_Out signal remains at a logic low level. The Clock_In signal is represented as a constant pulse square waveform. The rising edge of each clock pulse defines the beginning of a clock cycle. The Clock_In signal contains clock cycles T1–T5 as illustrated.

Prior to the rising edge of the Clock_In signal within interval T1, the Clock_In signal is equal to a logic low value, and the Clock_Enable signal is equal to a logic high value. Thus, the Clock_In# signal provided to the latch enable (LE) terminal is a logic high value. As a result, storage latch 110 provides the logic high Clock_Enable signal as the Clock_Gate_Control signal. The Clock_Out signal is equivalent to the logic low value of the Clock_In signal ANDed with the logic high value of the Clock_Gate_Control signal. As a result, the Clock_Out signal has a logic low value.

On the rising edge of the Clock_In signal within interval T1, the logic high value of the Clock_Enable signal is latched in storage latch 110. Thus, the Clock_Gate_Control signal remains a logic high value. Under these conditions, the logic value of the Clock_Out signal during interval T1 follows the logic value of the Clock_In signal. Prior to the rising edge within interval T2, while the Clock_In signal is equal to a logic low value, the Clock_Enable signal transitions from a logic high value to a logic low value. Because the Clock_In signal is low, thereby forcing the Clock_In# signal high, this transition of the Clock_Enable signal is reflected in the Clock_Gate_Control signal. However, because the Clock_In signal remains at a logic low value during this transition, the Clock_Out signal remains at a logic low value.

On the rising edge within interval T2, the logic low value of the Clock_Enable signal is latched in storage latch 110. Thus, the Clock_Gate_Control signal remains a logic low value. Under these conditions, the Clock_Out signal remains equal to a logic low value, regardless of the value of the Clock_In signal. After the rising edge within interval T2, the Clock_Enable signal transitions from a logic low value to a logic high value. However, the Clock_Gate_Control signal remains at a logic low value, because the Clock_In signal has a logic high value. As a result, the Clock_Out signal remains at a logic low value, and does not follow the Clock_In signal within interval T2. Therefore, during interval T2, the Clock_In signal has been gated (i.e., effectively disabled) by the Clock_Gate_Control signal. During interval T2, when the Clock_In signal transitions from a logic high value to a logic low value, the logic high value of the Clock_Enable signal is reflected in the Clock_Gate_Control signal. The Clock_Out signal remains at a logic low value due to the logic low value of the Clock_In signal.

On the rising edge within interval T3, the logic high value of the Clock_Enable signal is latched in storage latch 110. Thus, the Clock_Gate_Control signal remains at a logic high value. Under these conditions, the Clock_Out signal transitions from a logic low value to a logic high value in response to the Clock_In signal. After the rising edge within interval T3, the Clock_Enable signal transitions from a logic high value to a logic low value. However, the Clock_Gate_Control signal remains at a logic high value, because the Clock_In signal has a logic high value. As a result, the Clock_Out signal remains at a logic high value. Therefore, during interval T3, the Clock_In signal is not gated. Advantageously, the transition of the Clock_Enable signal does not cause less than a full clock pulse (called a runt clock pulse) to appear in the Clock_Out signal. During interval T3, when the Clock_In signal transitions from a logic high value to a logic low value, the logic low value of the Clock_Enable signal is reflected in the output signal of storage latch 110. The Clock_Out signal transitions from a logic high value to a logic low value, thereby following the Clock_In signal.

On the rising edge within interval T4, the logic low value of the Clock_Enable signal is latched in storage latch 110. Thus, the Clock_Gate_Control signal remains at a logic low value. Under these conditions, the Clock_Out signal remains equal to a logic low value. Because the Clock_Enable signal has a logic low value, the Clock_In signal within interval T4 has been suppressed in the Clock_Out signal. The Clock_In signal has therefore been gated during interval T4. Prior to the rising edge within interval T5, the Clock_Enable signal transitions to a logic high value. As a result, the Clock_Gate_Control signal transitions to a logic high value. However, the Clock_Out signal remains at a logic low value due to the logic low value of the Clock_In signal.

On the rising edge within interval T5, the logic high value of the Clock_Enable signal is latched in storage latch 110. Thus, the Clock_Gate_Control signal remains a logic high value. Under these conditions, the Clock_Out signal is equal to the logic value of the Clock_In signal. The Clock_In signal within interval T5 is therefore reflected in the Clock_Out signal.

In effect, the Clock_Gate_Control signal follows the Clock_Enable signal when the Clock_In signal has a logic low value. However, the Clock_Gate_Control signal does not change when the Clock_In signal has a logic high value. Because the Clock_Out signal is the logical AND of the Clock_In signal and the Clock_Gate_Control signal, the Clock_Gate_Control signal only affects the logic value of the Clock_Out signal when the Clock_In signal has a logic high value. Thus, the Clock_Enable signal does not operate to force the Clock_Out signal to a logic low value from a logic high value. Rather, the Clock_Enable signal operates to keep the Clock_Out signal at a logic low value when it is already at a logic low value.

Figure 3:
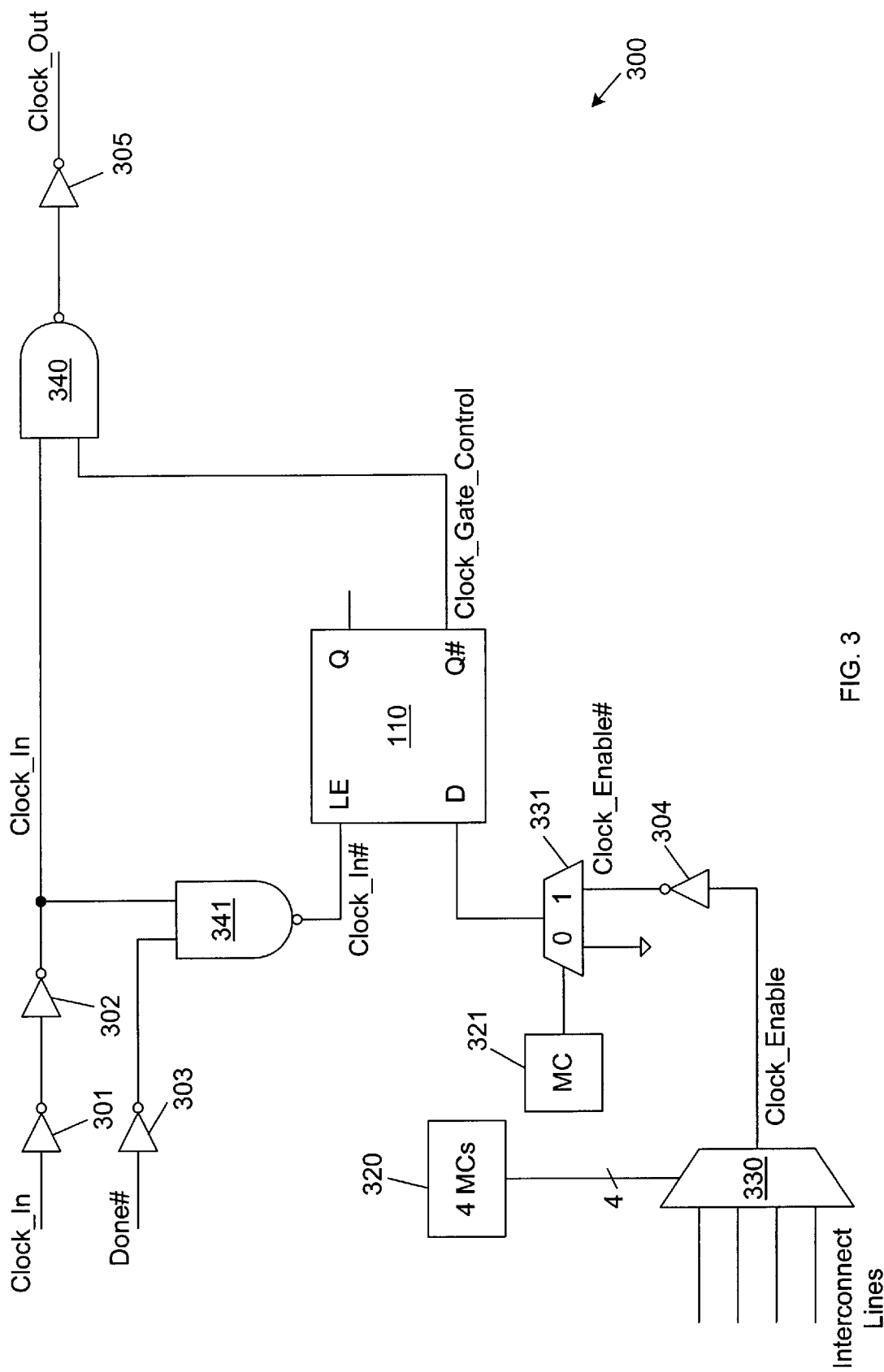
FIG. 3 is a schematic diagram of a clock gating circuit in accordance with another embodiment of the present invention.

FIG. 3 is a schematic diagram of clock gating circuit 300 in accordance with another embodiment of the present invention. Similar elements in FIGS. 1 and 3 are labeled similarly. FIG. 3 includes inverters 301–305, storage latch 110, configuration memory cells 320–321, multiplexers 330–331 and NAND gates 340–341, which are interconnected as follows.

Multiplexer 330 is coupled to receive four interconnect lines from the user-defined logic device and four configuration memory cell values from configuration memory cells 320. The interconnect lines are connective lines coupled to locations defined by the user. Configuration memory cells 320–321 are defined by the user during the configuration of the user-defined logic device. The logic values stored within configuration memory cells 320 determine which interconnect line signal from the general interconnect structure is provided as the output signal of multiplexer 330. Thus, configuration memory cells 320 and multiplexer 330 provide the interface to the general interconnect structure. The chosen interconnect line provides the Clock_Enable signal to clock-gating circuit 300. Inverter 304 is coupled to receive the Clock_Enable signal from multiplexer 330, and provide an inverted Clock_Enable signal, Clock_Enable#, to an input terminal of multiplexer 331. Multiplexer 331 has another input terminal coupled to a logic low value of ground. The control terminal of multiplexer 331 is coupled to receive the stored logic value in configuration memory cell 321. The logic value stored in configuration memory cell 321 determines whether the Clock_Enable# signal or ground is provided as the output signal of multiplexer 331. When clock gating circuit 300 is active, configuration memory cell 321 contains a logic high value. As a result, the Clock_Enable# signal is routed through multiplexer 331 to the data input (D) terminal of storage latch 110.

Inverter 301 is coupled to receive the Clock_In signal from the user-defined logic device. The Clock_In signal may come from an input pad of the user-defined logic device, or from elsewhere on the user-defined logic device. Inverter 302 is coupled to receive the output signal of inverter 301 (e.g., the inverted Clock_In signal). The output signal of inverter 302 (e.g., the Clock_In signal) is provided to the first input terminals of NAND gates 340–341. Inverter 303 is coupled to receive the Done# signal from the user-defined logic device. The Done# signal relates to the configuration operation of the user-defined logic device, and is provided by the user-defined logic device to clock gating circuit 300. The Done# signal indicates that the initial power up and configuration operation of the chip is complete. The Done# signal is active low, meaning that when the initial power up and configuration operation of the user-defined logic device is complete, the Done# signal is asserted low. After the initial power up and configuration operation is complete, the Done# signal remains at a constant logic low value. Inverter 303 is coupled to receive the Done# signal, and thus provides a logic high signal to the second input terminal of NAND gate 341 after initial power up. As a result, NAND gate 341 provides an output signal equal to the inverse of the Clock_In signal, or Clock_In#.

Storage latch 110 includes a latch enable (LE) terminal, a data input (D) terminal, a data output (Q) terminal, and an inverse data output (Q#) terminal, as illustrated. Storage latch 110 was described above in connection with FIGS. 1 and 2. The latch enable (LE) terminal is coupled to the output terminal of NAND gate 341, and the data input (D) terminal is coupled to the output terminal of multiplexer 331. The Clock_Gate_Control signal is provided at the inverse data output (Q#) terminal of storage latch 110. The inverse data output (Q#) terminal provides a signal value inverse to the signal value provided by the data output (Q) terminal. The signal value provided at the data output (Q) terminal is not used in clock gating circuit 300.

Storage latch 110 provides the Clock_Gate_Control signal to the second input terminal of NAND gate 340. NAND gate 340 provides an output value equal to the inverse of the logical AND of the Clock_In signal from inverter 302 with the Clock_Gate_Control signal from storage latch 110. Inverter 305 is coupled to receive the output signal of NAND gate 340, and provides the Clock_Out signal to the user-defined logic device. Thus, the Clock_Out signal is equivalent to the logical AND of the Clock_In signal and the Clock_Gate_Control signal. The Clock_Out signal is the gatable clock signal, which may be used for a process that does not require a continuously running clock.

Clock-gating circuit 300 may be either enabled or disabled, depending on the value of configuration memory cell 321. When clock-gating circuit 300 is disabled, the circuit does not gate the Clock_In signal. Thus, the Clock_Out signal follows the Clock_In signal. When clock-gating circuit 300 is enabled, the circuit selectively gates signal pulses of the Clock_In signal. Thus, the Clock_Out signal is the gatable Clock_In signal. Clock-gating circuit 300 operates as follows.

To disable clock-gating circuit 300, configuration memory cell 321 is programmed to have a logic low value. This logic low value of configuration memory cell 321 causes the signal at the output terminal of multiplexer 331 to have a constant logic low value. As a result, storage latch 110 receives a constant logic low value at the data input (D) terminal. Because the value at the data input (D) terminal is the value latched or passed by storage latch 110, the signal at the data output (Q) terminal also has a constant logic low value. As noted above, the Clock_Gate_Control signal provided at the inverse data output (Q#) terminal is the inverse of the output signal provided at the data output (Q) terminal. Therefore, the Clock_Gate_Control signal has a constant logic high value. The constant logic high value of the Clock_Gate_Control signal provided to the second input terminal of NAND gate 340 causes NAND gate 340 to have an output signal value equivalent to the inverse of the Clock_In signal provided to the first input terminal. Inverter 305 is coupled to receive the inverted Clock_In signal, which again is inverted. Under these conditions, inverter 305 provides the Clock_In signal as the Clock_Out signal.

To enable clock-gating circuit 300, configuration memory cell 321 is chosen to have a logic high value. Configuration memory cells 320 are chosen such that one of four possible interconnect lines is passed by multiplexer 330 as the Clock_Enable signal. The logic high value of configuration memory cell 321 causes multiplexer 331 to provide the Clock_Enable# signal from inverter 304 to the data input (D) terminal of storage latch 110.

As noted above, after initial configuration and power up of the chip, the Clock_In# signal is provided to the latch enable (LE) terminal of storage latch 110. When this Clock_In# signal has a logic high value, storage latch 110 provides the Clock_Enable# signal from the data input (D) terminal at the data output (Q) terminal. For example, when the Clock_In signal has a low logic value, the Clock_In# signal has a logic high value. Under these conditions, storage latch 110 provides the logic value (e.g., a logic low value) of the Clock_Enable# signal at the data output (Q) terminal, and the inverted Clock_Enable# signal (i.e., the Clock_Enable signal) at the inverse data output (Q#) terminal. Thus, the Clock_Gate_Control signal is equivalent to the Clock_Enable signal when clock gating circuit 300 is enabled. Under these conditions, if the Clock_Enable# signal transitions to a logic high value, the Clock_Gate_Control signal transitions to a logic low value.

When the Clock_In# signal transitions to a logic low value, the Clock_Enable# signal is latched in storage latch 110 and remains latched in storage latch 110 as long as the Clock_In# signal remains low. For example, when the Clock_In# signal transitions to a logic low value and the Clock_Enable# signal has a logic low value, a logic low value is latched into storage latch 110. As a result, the Clock_Gate_Control signal has a logic high value. Under these conditions, the Clock_Gate_Control signal remains at a logic high value, even if the Clock_Enable# signal transitions to a logic high value.

NAND gate 340 is coupled to receive the Clock_In signal at a first input terminal and the Clock_Gate_Control signal at a second input terminal. Inverter 305 is coupled to receive the output signal from NAND gate 340, and in turn provides the Clock_Out signal. As a result, the Clock_Out signal is equal to the Clock_In signal logically ANDed with the Clock_Gate_Control signal.

Figure 4:
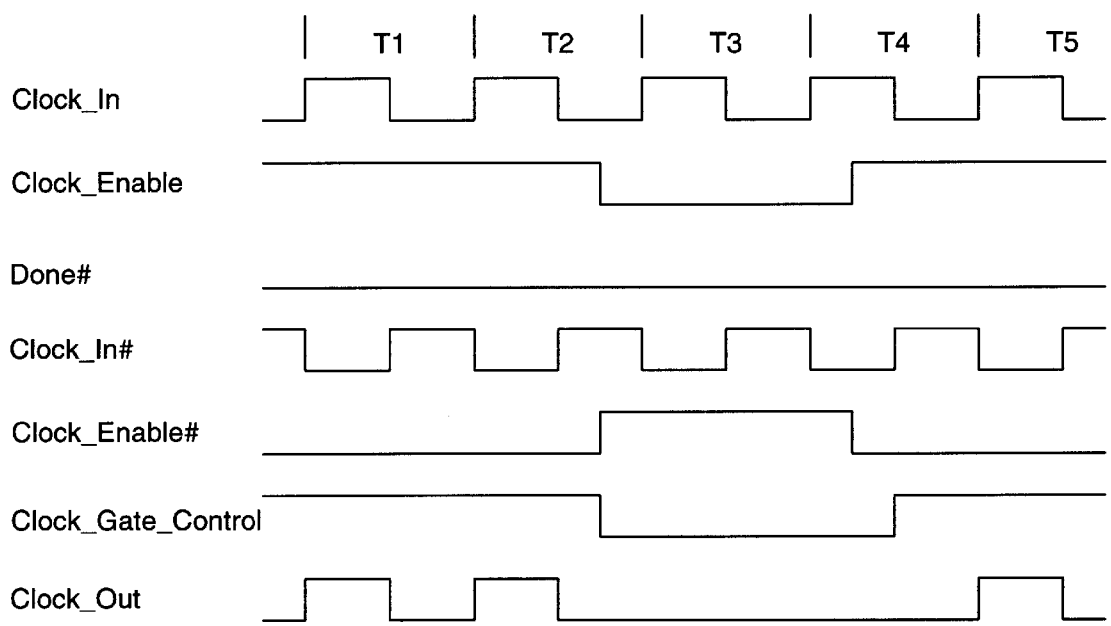
FIG. 4 is a waveform diagram of the timing signals of the clock gating circuit of FIG. 3.

FIG. 4 is a waveform diagram describing the timing characteristics of clock gating circuit 300 of FIG. 3. Note that signal delays are not represented in this diagram. The three input signals Clock_In, Clock_Enable, and Done# have waveforms as shown in FIG. 4. The Clock_In signal contains clock cycles T1–T5 as illustrated. Configuration memory cell 321 is programmed to have a logic high value to pass the Clock_Enable# signal to the data input (D) terminal of storage latch 110.

Prior to the rising edge of the Clock_In signal in interval T1, the Clock_In# signal has a logic high value and the Clock_Enable# signal has a logic low value. As a result, storage latch 110 provides the inverted logic value of the Clock_Enable# signal (e.g., a logic high value) as the Clock_Gate_Control signal. The Clock_Out signal is equivalent to the logic low value of the Clock_In signal ANDed with the logic high value of the Clock_Gate_Control signal. As a result, the Clock_Out signal has a logic low value.

On the rising edge of the Clock_In signal in interval T1, the logic low value of the Clock_Enable# signal is latched in storage latch 110. Thus, the Clock_Gate_Control signal remains at a logic high value. Under these conditions, the logic value of the Clock_Out signal during interval T1 follows the logic value of the Clock_In signal.

On the rising edge of the Clock_In signal in interval T2, the logic low value of the Clock_Enable# signal is latched in storage latch 110. Thus, the Clock_Gate_Control signal remains at a logic high value. Under these conditions, the logic value of the Clock_Out signal during interval T2 follows the logic value of the Clock_In signal. After the falling edge of the Clock_In signal in interval T2, the Clock_Enable signal is asserted low, thereby resulting in a logic high Clock_Enable# signal. Because the Clock_In signal is low, the Clock_Gate_Control signal transitions to a logic low value following the Clock_Enable# signal. Because the Clock_In signal has a logic low value, the Clock_Out signal remains at a logic low value.

On the rising edge of the Clock_In signal in interval T3, the logic high value of the Clock_Enable# signal is latched in storage latch 110. Thus, the Clock_Gate_Control signal remains at a logic low value. Under these conditions, the Clock_Out signal remains equal to a logic low value. Therefore, during interval T3, the Clock_In signal has been gated.

On the rising edge of the Clock_In signal in interval T4, the logic high value of the Clock_Enable# signal is latched in storage latch 110. Thus, the Clock_Gate_Control signal remains at a logic low value. Under these conditions, the Clock_Out signal remains equal to a logic low value. Therefore, during interval T4, the Clock_In signal has been gated. Prior to the falling edge of the Clock_In signal in interval T4, the Clock_Enable signal is asserted high, thereby causing the Clock_Enable# signal to transition to a logic low value. Because the Clock_In signal has a logic high value, this change in the value of the Clock_Enable# signal is not reflected in the Clock_Gate_Control signal. Thus, the Clock_Gate_Control signal remains at a logic low value. Advantageously, the transition of the Clock_Enable signal does not cause a runt clock pulse to appear in the Clock_Out signal.

During interval T4, the Clock_In signal transitions from a logic high value to a logic low value. At this time, the logic low value of the Clock_Enable# signal is reflected in the Clock_Gate_Control signal. Thus, the Clock_Gate_Control signal transitions to a logic high value. Because the Clock_In signal has a logic low value, the Clock_Out signal remains at a logic low value.

On the rising edge of the Clock_In signal in interval T5, the logic low value of the Clock_Enable# signal is latched in storage latch 110. Thus, the Clock_Gate_Control signal remains at a logic high value. Under these conditions, the logic value of the Clock_Out signal during interval T5 follows the logic value of the Clock_In signal.

In one embodiment, clock gating circuit 300 is implemented for each global clock input on a user-defined logic device and is activated by configuration memory cell bits. Therefore, any process requiring a synchronous system clock receives either the continuous Clock_In system clock signal or the gatable Clock_In signal (e.g., the Clock_Out signal), depending on the requirements of each process. In a particular embodiment, clock gating circuit 300 is transparent when not activated. In this particular embodiment, the Clock_Out signal follows the Clock_In signal with only minimal delay being added by the clock gating circuit 300.

Similar to clock gating circuit 100, the Clock_Enable signal does not operate to force the Clock_Out signal to a logic low value from a logic high value. Rather, the Clock_Enable signal operates to keep the Clock_Out signal at a logic low value when it is already at a logic low value.

Figure 5:
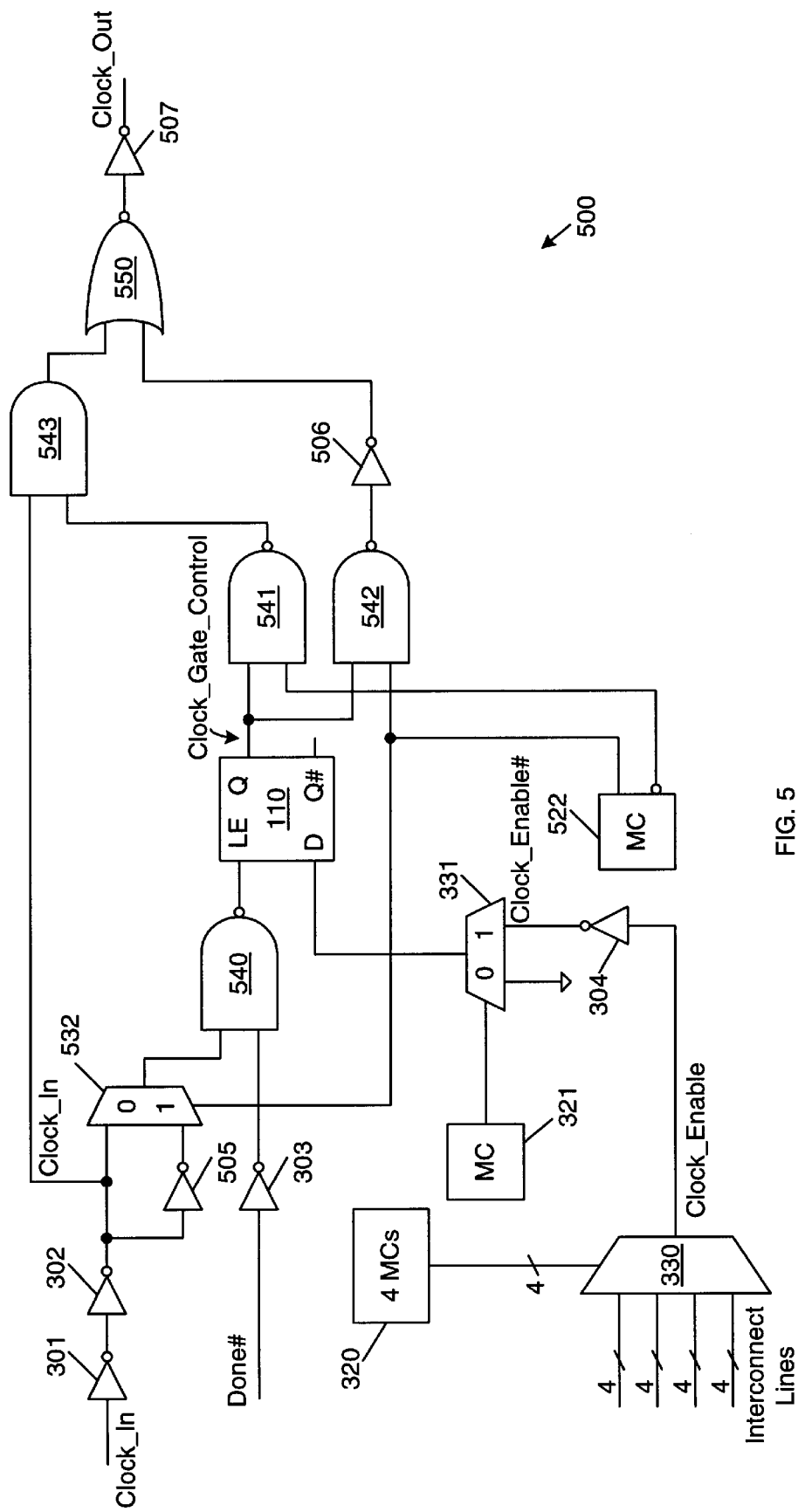
FIG. 5 is a schematic diagram of a clock gating circuit in accordance with another embodiment of the present invention.

FIG. 5 is a schematic diagram of a clock gating circuit in accordance with another embodiment of the present invention. Similar elements in FIGS. 1, 3 and 5 are labeled similarly. FIG. 5 includes inverters 301–304 and 505–507, storage latch 110, configuration memory cells 320–321 and 522, multiplexers 330–331 and 532, NAND gates 540–542, AND gate 543 and NOR gate 550, which are interconnected as follows. The Clock_Enable circuit is the same as in clock gating circuit 300 of FIG. 3, and therefore is not described a second time.

Inverter 301 is coupled to receive the Clock_In signal from the user-defined logic device. The Clock_In signal may come from an input pad of the user-defined logic device, or from elsewhere on the user-defined logic device. Inverter 302 is coupled to receive the inverted Clock_In signal, Clock_In#, from the output terminal of inverter 301. The inverted Clock_In# signal (i.e., the Clock_In signal) at the output terminal of inverter 302 is provided to the first input terminals of inverter 505, multiplexer 532 and AND gate 543. The inverted Clock_In signal, Clock_In#, at the output terminal of inverter 505 is provided to the second input terminal of multiplexer 532. The control terminal of multiplexer 532 is coupled to receive the stored logic value within configuration memory cell 522. The logic value stored within configuration memory cell 522 determines whether the Clock_In signal or the Clock_In# signal is provided as the output signal of multiplexer 532. A logic high value stored in configuration memory cell 522 passes the Clock_In# signal to the first input terminal of NAND gate 540. A logic low value stored in configuration memory cell 522 passes the Clock_In signal to the first input terminal of NAND gate 540.

Inverter 303 is coupled to receive the Done# signal from the user-defined logic device. As described above, the Done# signal is asserted low at the completion of the initial power up and configuration operation. NAND gate 540 is coupled to receive the output signal of inverter 303 at a second input terminal. Thus, after the initial power up and configuration operation, inverter 303 provides a constant logic high value to the second input terminal of NAND gate 540. As a result, NAND gate 540 provides an output signal equal to the inverse of the output signal of multiplexer 532 to the latch enable (LE) terminal of storage latch 110. Thus, if the logic value stored within configuration memory cell 522 is a logic high value, the Clock_In signal is provided to the latch enable (LE) terminal of storage latch 110. However, if the logic value stored within configuration memory cell 522 is a logic low value, the Clock_In# signal is provided to the latch enable (LE) terminal of storage latch 110.

Storage latch 110 includes a latch enable (LE) terminal, a data input (D) terminal, a data output (Q) terminal, and an inverse data output (Q#) terminal, as illustrated. Storage latch 110 was described above in connection with FIGS. 1 and 2. The latch enable (LE) terminal is coupled to the output terminal of NAND gate 540, and the data input (D) terminal is coupled to the output terminal of multiplexer 331 as in FIG. 3. The Clock_Gate_Control signal is provided at the data output (Q) terminal of storage latch 110. The inverse data output (Q#) terminal provides a signal value that is the inverse of the signal provided by the data output (Q) terminal. The signal value provided by the inverse data output (Q#) terminal is not used in clock gating circuit 500.

Storage latch 110 provides the Clock_Gate_Control signal to the first input terminals of NAND gates 541–542. The second input terminal of NAND gate 541 is coupled to receive the inverted logic value of the logic value stored within configuration memory cell 522. The output signal of NAND gate 541 is provided to the second input terminal of AND gate 543. Thus, the output signal of AND gate 543 is the logical AND of the Clock_In signal with the output signal of NAND gate 541. This output signal of AND gate 543 is provided to the first input terminal of NOR gate 550.

The second input terminal of NAND gate 542 is coupled to receive the logic value stored within configuration memory cell 522. The output signal of NAND gate 542 is provided to the input terminal of inverter 506. The output signal of inverter 506 is provided to the second input terminal of NOR gate 550. Thus, the output signal of NOR gate 550 is the inverse of the logical OR of the output signal of AND gate 543 with the inverted output signal of NAND gate 542. The output signal from NOR gate 550 is provided to the input terminal of inverter 507. Inverter 507 provides the Clock_Out signal to the user-defined logic device. Thus, the Clock_Out signal is equivalent to the logical OR of the output signal of AND gate 543 with the inverted output signal of NAND gate 542. The Clock_Out signal is the gatable clock signal, which may be used for a process that does not require a continuously running clock.

Clock gating circuit 500 may be either enabled or disabled, depending on the value stored in configuration memory cell 321. When clock gating circuit 500 is disabled, the circuit does not gate the Clock_In signal. Thus, the Clock_Out signal follows the Clock_In signal. When clock gating circuit 500 is enabled, the circuit selectively gates pulses of the Clock_In signal. Thus, the Clock_Out signal is the gatable Clock_In signal. Clock gating circuit 500 operates as follows.

To disable the clock gating circuit 500, configuration memory cell 321 is programmed to have a logic low value. This logic low value of configuration memory cell 321 causes the signal at the output terminal of multiplexer 331 to have a constant logic low value. As a result, storage latch 110 receives a constant logic low value at the data input (D) terminal. Because the value at the data input (D) terminal is the value latched or passed by storage latch 110, the signal at the data output (Q) terminal also has a constant logic low value. Thus, the Clock_Gate_Control signal provided at the data output (Q) terminal has a constant logic low value. The logic low value of the Clock_Gate_Control signal forces the output signals of NAND gates 541–542 to a logic high value. Therefore, AND gate 543 provides the Clock_In signal to the first input terminal of NOR gate 550, and inverter 506 provides a constant logic low value to the second input terminal of NOR gate 550. Under these conditions, inverter 507 provides the Clock_In signal as the Clock_Out signal.

To enable the clock gating circuit 500, configuration memory cell 321 is programmed to have a logic high value. Configuration memory cells 320 are programmed such that one of sixteen possible interconnect lines is passed by multiplexer 330 as the Clock_Enable signal. The logic high value stored in configuration memory cell 321 causes multiplexer 331 to provide the Clock_Enable# signal from inverter 304 to the data input (D) terminal of storage latch 110.

As noted above, after initial configuration and power up of the chip, the signal provided to the latch enable (LE) terminal of storage latch 110 is equal to either the Clock_In signal or the Clock_In# signal, depending on the value stored within configuration memory cell 522. Therefore, the operation of clock gating circuit 500 depends on the value stored within configuration memory cell 522.

If the value stored within configuration memory cell 522 is a logic low value, then the Clock_In# signal is provided to the latch enable (LE) terminal of storage latch 110. When this Clock_In# signal has a logic high value, storage latch 110 provides the Clock_Enable# signal from the data input (D) terminal at the data output (Q) terminal. For example, when the Clock_In signal has a logic low value, the Clock_In# signal has a logic high value. Under these conditions, storage latch 110 provides the logic value (e.g., a logic low value) of the Clock_Enable# signal at the data output (Q) terminal, and the inverted Clock_Enable# signal (i.e., the Clock_Enable signal) at the inverse data output (Q#) terminal. Thus, the Clock_Gate_Control signal is equivalent to the Clock_Enable# signal when clock gating circuit 500 is enabled and configuration memory cell 522 stores a logic low value. Under these conditions, if the Clock_Enable# signal transitions to a logic high value, the Clock_Gate_Control signal transitions to a logic high value.

When the Clock_In# signal transitions to a logic low value, the Clock_Enable# signal is latched in storage latch 110 and remains latched in storage latch 110 as long as the Clock_In# signal remains low. For example, when the Clock_In# signal transitions to a logic low value and the Clock_Enable# signal has a logic low value, a logic low value is latched into storage latch 110. As a result, the Clock_Gate_Control signal has a logic low value. Under these conditions, the Clock_Gate_Control signal remains at a logic low value, even if the Clock_Enable# signal transitions to a logic high value.

Because the value stored within configuration memory cell 522 is a logic low value, a logic high value is provided to the second input terminal of NAND gate 541 and a logic low value is provided to the second input terminal of NAND gate 542. The logic low value provided to the second input terminal of NAND gate 542 forces a constant logic high value output signal to be provided to inverter 506. Thus, inverter 506 provides a constant logic low value to the second input terminal of NOR gate 550. The logic high value provided to the second input terminal of NAND gate 541 forces the output signal provided to AND gate 543 to be equal to the inverse Clock_Gate_Control signal, Clock_Gate_Control#. As a result, the Clock_Out signal is equal to the logical AND of the Clock_In signal with the Clock_Gate_Control# signal.

If the value stored within configuration memory cell 522 is a logic high value, then the Clock_In signal is provided to the latch enable (LE) terminal of storage latch 110. When this Clock_In signal has a logic high value, storage latch 110 provides the Clock_Enable# signal from the data input (D) terminal at the data output (Q) terminal. For example, when the Clock_In signal has a logic high value, storage latch 110 provides the logic value (e.g., a logic low value) of the Clock_Enable# signal at the data output (Q) terminal, and the inverted Clock_Enable# signal (i.e., the Clock_Enable signal) at the inverse data output (Q#) terminal. Thus, the Clock_Gate_Control signal is equivalent to the Clock_Enable# signal when clock gating circuit 500 is enabled and configuration memory cell 522 stores a logic high value. Under these conditions, if the Clock_Enable# signal transitions to a logic high value, the Clock_Gate_Control signal also transitions to a logic high value.

When the Clock_In signal transitions to a logic low value, the Clock_Enable# signal is latched in storage latch 110 and remains latched in storage latch 110 as long as the Clock_In signal remains low. For example, when the Clock_In signal transitions to a logic low value and the Clock_Enable# signal has a logic low value, a logic low value is latched into storage latch 110. As a result, the Clock_Gate_Control signal has a logic low value. Under these conditions, the Clock_Gate_Control signal remains at a logic low value, even if the Clock_Enable# signal transitions to a logic high value.

Because the value stored within configuration memory cell 522 is a logic high value, a logic low value is provided to the second input terminal of NAND gate 541 and a logic high value is provided to the second input terminal of NAND gate 542. The logic low value provided to the second input terminal of NAND gate 541 forces a constant logic high output signal value to be provided to AND gate 543. Thus, AND gate 543 provides the Clock_In signal to the first input terminal of NOR gate 550. The logic high value provided to the second input terminal of NAND gate 542 forces the output signal provided to inverter 506 to be equal to the inverse Clock_Gate_Control signal, Clock_Gate_Control#. Thus, the Clock_Gate_Control signal is provided to the second input terminal of NOR gate 550 from the output terminal of inverter 506. As a result, the Clock_Out signal is equal to the logical OR of the Clock_In signal with the Clock_Gate_Control signal.

The value stored in configuration memory cell 522 allows the user to determine the logic value at which the Clock_In signal is gated. For example, a logic high value stored in configuration memory cell 522 produces a logic high value of the Clock_Out signal when the Clock_In signal is gated. By controlling the value at which the Clock_In signal is gated, the user controls the nature of the next edge of the Clock_Out signal when the Clock_In signal is no longer gated. For example, gating the Clock_In signal at a logic high value necessarily results in a falling Clock_Out signal edge when the Clock_In signal is no longer gated. The effect of configuration memory cell 522 on clock gating circuit 500 is shown in FIGS. 6 and 7.

Figure 6:
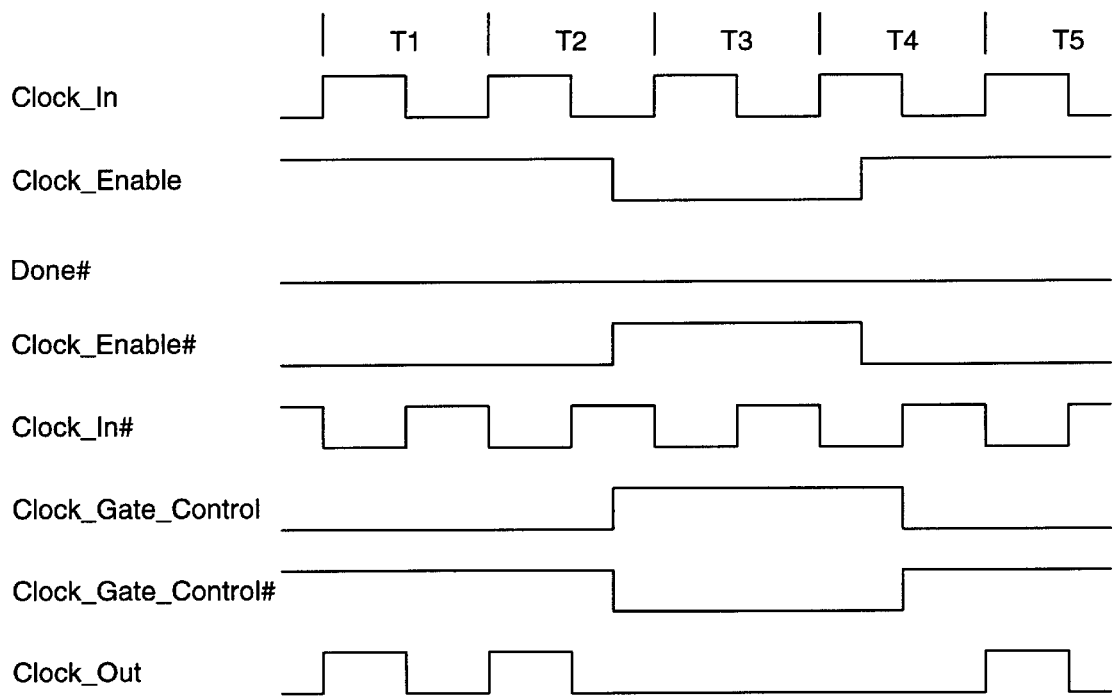
FIG. 6 is a waveform diagram of the timing signals of the clock gating circuit of FIG. 5.
Figure 7:
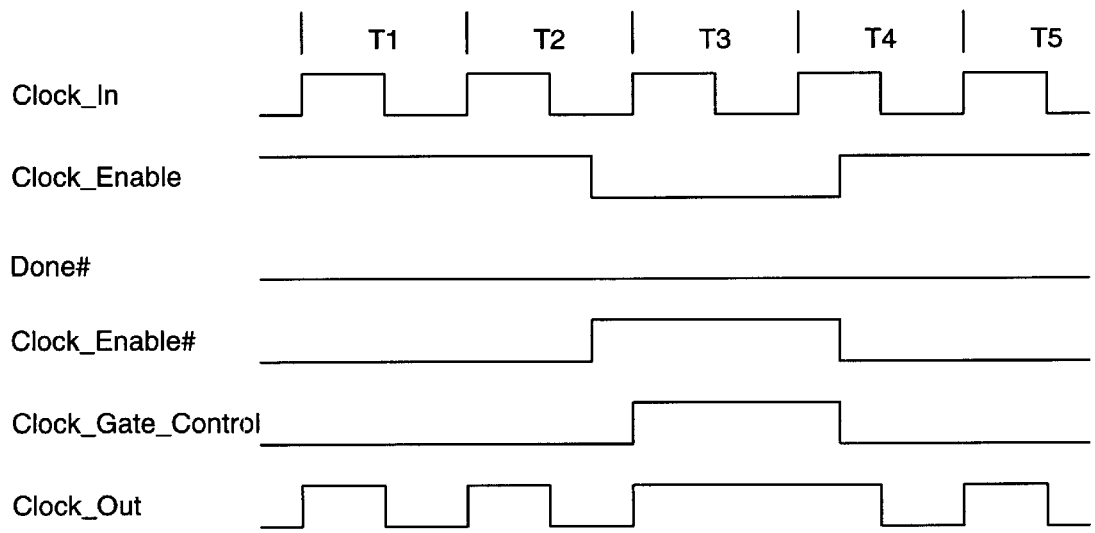
FIG. 7 is another waveform diagram of the timing signals of the clock gating circuit of FIG. 5.

FIG. 6 is a waveform diagram demonstrating the timing characteristics of clock gating circuit 500 of FIG. 5 when configuration memory cell 522 contains a low logic value and configuration memory cell 321 contains a logic high value. Note that signal delays are not represented in this diagram. The three input signals Clock_In, Clock_Enable, and Done# have waveforms as shown in FIG. 6. The Clock_In signal contains clock cycles T1–T5 as illustrated. The logic high value stored within configuration memory cell 321 causes multiplexer 331 to provide the Clock_Enable# signal from inverter 304 to the data input (D) terminal of storage latch 110.

Prior to the rising edge of the Clock_In signal within interval T1, the Clock_In# signal has a logic high value and the Clock_Enable# signal has a logic low value. As a result, storage latch 110 provides the logic low value of the Clock_Enable# signal as the Clock_Gate_Control signal. The Clock_Out signal is equivalent to the logical AND of the logic low value of the Clock_In signal with the logic high value of the Clock_Gate_Control# signal. As a result, the Clock_Out signal has a logic low value.

On the rising edge of the Clock_In signal in interval T1, the logic low value of the Clock_Enable# signal is latched in storage latch 110. Thus, the Clock_Gate_Control signal remains at a logic low value. As a result, a logic high value is provided to the second input terminal of AND gate 543. Under these conditions, the logic value of the Clock_Out signal during interval T1 follows the logic value of the Clock_In signal.

On the rising edge of the Clock_In signal in interval T2, the logic low value of the Clock_Enable# signal is latched in storage latch 110. Thus, the Clock_Gate_Control signal remains at a logic low value. As a result, a logic high value is provided to the second input terminal of AND gate 543. Under these conditions, the logic value of the Clock_Out signal during interval T2 follows the logic value of the Clock_In signal. After the falling edge of the Clock_In signal in interval T2, the Clock_Enable signal is de-asserted low, thereby resulting in a logic high Clock_Enable# signal. Because the Clock_In signal is low, the Clock_Gate_Control signal transitions to a logic high value in response to the Clock_Enable# signal. Because the Clock_In has a logic low value, the Clock_Out signal remains at a logic low value.

On the rising edge of the Clock_In signal in interval T3, the logic high value of the Clock_Enable# signal is latched in storage latch 110. Thus, the Clock_Gate_Control signal remains at a logic high value. As a result, a logic low value is provided to the second input terminal of AND gate 543. Under these conditions, the Clock_Out signal remains equal to a logic low value. Therefore, during interval T3, the Clock_In signal has been gated.

On the rising edge of the Clock_In signal in interval T4, the logic high value of the Clock_Enable# signal is latched in storage latch 110. Thus, the Clock_Gate_Control signal remains at a logic high value. As a result, a logic low value is provided to the second input terminal of AND gate 543. Under these conditions, the Clock_Out signal remains equal to a logic low value. Therefore, during interval T4, the Clock_In signal has been gated.

Prior to the falling edge of the Clock_In signal in interval T4, the Clock_Enable signal is asserted high, thereby resulting in a logic low Clock_Enable#. Because the Clock_In signal has a logic high value, this change in the value of the Clock_Enable# signal is not reflected in the Clock_Gate_Control signal. Thus, the Clock_Gate_Control signal remains at a logic high value. Advantageously, the transition of the Clock_Enable signal does not cause a runt clock pulse to appear in the Clock_Out signal.

During interval T4, the Clock_In signal transitions from a logic high value to a logic low value. At this time, the logic low value of the Clock_Enable# signal is reflected in the Clock_Gate_Control signal. Thus, the Clock_Gate_Control signal transitions to a logic low value. As a result, a logic high value is provided to the second input terminal of AND gate 543. Because the Clock_In signal has a logic low value, the Clock_Out signal remains at a logic low value.

On the rising edge of the Clock_In signal in interval T5, the logic low value of the Clock_Enable# signal is latched in storage latch 110. Thus, the Clock_Gate_Control signal remains at a logic low value. As a result, a logic high value is provided to the second input terminal of AND gate 543. Under these conditions, the logic value of the Clock_Out signal during interval T5 follows the logic value of the Clock_In signal.

FIG. 7 is a waveform diagram demonstrating the timing characteristics of clock gating circuit 500 of FIG. 5 when configuration memory cells 522 and 321 each contain a high logic value. Note that signal delays are not represented in this diagram. The three input signals Clock_In, Clock_Enable, and Done# have waveforms as shown in FIG. 7. The Clock_In signal contains clock cycles T1–T5 as illustrated. Configuration memory cell 321 is programmed to have a logic high value to cause multiplexer 331 to pass the inverted Clock_Enable signal, Clock_Enable#.

Prior to the falling edge of the Clock_In signal in interval T1, the Clock_In signal has a logic high value and the Clock_Enable# signal has a logic low value. As a result, storage latch 110 provides the logic value of the Clock_Enable# signal (e.g., a logic low value) as the Clock_Gate_Control signal. The Clock_Out signal is equivalent to the logical OR of the logic high value of the Clock_In signal with the logic low value of the Clock_Gate_Control signal. As a result, the Clock_Out signal has a logic high value.

On the falling edge of the Clock_In signal in interval T1, the logic low value of the Clock_Enable# signal is latched in storage latch 110. Thus, the Clock_Gate_Control signal remains at a logic low value. As a result, a logic low value is provided to the second input terminal of NOR gate 550. Under these conditions, the logic value of the Clock_Out signal during interval T1 follows the logic value of the Clock_In signal.

On the falling edge of the Clock_In signal in interval T2, the logic low value of the Clock_Enable# signal is latched in storage latch 110. Thus, the Clock_Gate_Control signal remains at a logic low value. As a result, a logic low value is provided to the second input terminal of NOR gate 550. Under these conditions, the logic value of the Clock_Out signal during interval T2 follows the logic value of the Clock_In signal.

Prior to the rising edge of the Clock_In signal in interval T3, the Clock_Enable signal is asserted low, thereby resulting in a logic high Clock_Enable# signal. Because the Clock_In signal has a logic low value, this change in the logic value of the Clock_Enable# signal is not reflected in the Clock_Gate_Control signal. Thus, the Clock_Gate_Control signal remains at a logic low value. Advantageously, the transition of the Clock_Enable signal does not cause a runt clock pulse to appear in the Clock_Out signal.

On the rising edge of the Clock_In signal in interval T3, the logic high value of the Clock_Enable# signal is passed by storage latch 110. Thus, the Clock_Gate_Control signal transitions to a logic high value. As a result, a logic high value is provided to the second input terminal of NOR gate 550. Under these conditions, the Clock_Out signal transitions to a logic high value.

On the falling edge of the Clock_In signal in interval T3, the logic high value of the Clock_Enable# signal is latched in storage latch 110. Thus, the Clock_Gate_Control signal remains at a logic high value. As a result, a logic high value is provided to the second input terminal of NOR gate 550. Under these conditions, the Clock_Out signal remains equal to a logic high value. Therefore, during the latter half of interval T3, the Clock_In signal has been gated. Note that the gated Clock_In signal has a logic high value, not a logic low value as in the conditions shown in FIG. 6.

On the rising edge of the Clock_In signal in interval T4, the logic high value of the Clock_Enable# signal is passed by storage latch 110. Thus, the Clock_Gate_Control signal remains at a logic high value. As a result, a logic high value is provided to the second input terminal of NOR gate 550. Under these conditions, the Clock_Out signal remains equal to a logic high value. Therefore, during the first half of interval T4, the Clock_In signal has been gated.

Prior to the falling edge of the Clock_In signal in interval T4, the Clock_Enable signal is asserted high, thereby causing the Clock_Enable# signal to transition to a logic low value. Because the Clock_In signal has a logic high value, this change in the logic value of the Clock_Enable# signal is reflected in the Clock_Gate_Control signal. Thus, the Clock_Gate_Control signal transitions to a logic low value. However, because the Clock_In signal is equal to a logic high value, the Clock_Out signal remains at a logic high value. Advantageously, the transition of the Clock_Enable signal does not cause a runt clock pulse to appear in the Clock_Out signal.

On the falling edge of the Clock_In signal in interval T4, the logic low value of the Clock_Enable# signal is latched in storage latch 110. Thus, the Clock_Gate_Control signal remains at a logic low value. As a result, a logic low value is provided to the second input terminal of NOR gate 550. Under these conditions, the logic value of the Clock_Out signal transitions to a logic low value, thereby following the Clock_In signal.

On the rising edge of the Clock_In signal in interval T5, the logic low value of the Clock_Enable# signal is passed by storage latch 110. Thus, the Clock_Gate_Control signal remains at a logic low value. As a result, a logic low value is provided to the second input terminal of NOR gate 550. Under these conditions, the logic value of the Clock_Out signal during interval T5 follows the logic value of the Clock_In signal.

In one embodiment, clock gating circuit 500 is implemented for each global clock input on a user-defined logic device and is activated by configuration memory cell bits. Therefore, any process requiring a synchronous system clock receives either the continuous system Clock_In signal or the gatable Clock_In signal (e.g., the Clock_Out signal), depending on the requirements of each process. In a particular embodiment, clock gating circuit 500 is transparent when not activated. In this particular embodiment, the Clock_Out signal follows the Clock_In signal with only minimal delay being added by the clock gating circuit 500.

As described above, clock gating circuit 500 responds to either the rising or falling edges of the Clock_In signal, depending on the value stored in configuration memory cell 522.

When configuration memory cell 522 stores a logic low value as in FIG. 6, the inverse Clock_Gate_Control signal follows the Clock_Enable signal when the Clock_In signal has a logic low value. However, the inverse Clock_Gate_Control signal does not change when the Clock_In signal has a logic high value. Because the Clock_Out signal is the logical AND of the Clock_In signal and the inverse of the Clock_Gate_Control signal, the inverse Clock_Gate_Control signal only affects the logic value of the Clock_Out signal when the Clock_In signal has a logic high value. Thus, the Clock_Enable does not operate to force the Clock_Out signal to a logic low value from a logic high value. Rather, the Clock_Enable operates to keep the Clock_Out signal at a logic low value when it is already at a logic low value.

When configuration memory cell 522 stores a logic high value as in FIG. 7, the Clock_Gate_Control signal follows the Clock_Enable# signal when the Clock_In signal has a logic high value. However, the Clock_Gate_Control signal does not change when the Clock_In signal has a logic low value. Because the Clock_Out signal is the logical OR of the Clock_In signal and the Clock_Gate_Control signal, the Clock_Gate_Control signal only affects the logic value of the Clock_Out signal when the Clock_In signal has a logic low value. Thus, the Clock_Enable operates to keep the Clock_Out signal at a logic high value when it is already at a logic high value.

The timing diagrams as shown in FIGS. 2, 4, 6, and 7 do not represent the various delays caused by the circuit elements (e.g., inverters 301–304 and 505–507). It is understood that the Clock_Out signal tracks the Clock_In signal with a certain delay depending on the design of the embodiment.

Although the invention has been described in connection with several embodiments, it is understood that this invention is not limited to the embodiments disclosed, but is capable of various modifications which would be apparent to a person skilled in the art. For example, multiplexer 330 can be implemented to receive eight interconnect lines and five configuration memory cell values. Further, the invention can be implemented using control signals supplied by another circuit, or externally supplied, rather than configuration memory cells. The circuits of the invention can thus be implemented in non-programmable (i.e., non user-defined) logic devices. Thus, the invention is limited only by the following claims.

We claim:

1. A method of gating a clock signal in a user-defined logic device, the method comprising the steps of:
    providing a clock signal to a storage latch of the user-defined logic device, wherein the clock signal transitions between a first logic state and a second logic state;
    providing a clock enable signal to the storage latch;
    enabling the storage latch to provide a gate control signal representative of the clock enable signal while the clock signal is in the first logic state;
    latching the clock enable signal in the storage latch when the clock signal transitions from the first logic state to the second logic state, wherein the clock enable signal remains latched in the storage latch as long as the clock signal remains in the second logic state, the storage latch providing the gate control signal with a value representative of the latched clock enable signal while the clock signal remains in the second logic state;
    controlling the gating of the clock signal on the user-defined logic device with the gate control signal; and
    routing the clock signal to an array of configurable logic blocks of the user-defined logic device through a global routing circuit of the user-defined logic device, thereby programmably controlling the configurable logic blocks.

2. A clock gating circuit in a user-defined logic device including an array of configurable logic blocks, the clock gating circuit comprising:
    an input terminal for receiving an input clock signal;
    an input terminal for receiving a clock enable signal;
    a storage latch coupled to receive the input clock signal and the clock enable signal, and in response, provide a clock gate control signal;
    a logic gate coupled to receive the input clock signal and the clock gate control signal, wherein the logic gate selectively routes the input clock signal in response to the clock gate control signal, thereby providing an output clock signal; and
    a global routing circuit for routing the output clock signal to the array of configurable logic blocks,
    wherein the array of configurable logic blocks is programmably controlled by the output clock signal.

3. The clock gating circuit of claim 2, wherein the clock gating circuit is located outside the array of configurable logic blocks.

4. The clock gating circuit of claim 2, wherein the clock gating circuit is configured by memory cells.

5. The clock gating circuit of claim 2, wherein the storage latch has a data terminal coupled to receive the clock enable signal and a latch enable terminal coupled to receive the input clock signal.

6. The clock gating circuit of claim 2, wherein the logic gate comprises an AND gate.

7. A clock gating circuit comprising:
    an input terminal for receiving an input clock signal;
    an input terminal for receiving a clock enable signal;
    a storage latch coupled to receive the input clock signal and the clock enable signal, and in response, provide a clock gate control signal;
    a NAND gate coupled to receive the input clock signal and the clock gate control signal; and
    an inverter coupled to receive an output signal from the NAND gate, wherein the NAND gate selectively routes the input clock signal in response to the clock gate control signal, the inverter thereby providing the output clock signal.

8. A clock gating circuit comprising:
    an input terminal for receiving an input clock signal;
    an input terminal for receiving a clock enable signal;
    a storage latch coupled to receive the input clock signal and the clock enable signal, and in response, provide a clock gate control signal;
    a programmable memory cell storing a logic value;
    a first NAND gate coupled to receive the clock gate control signal and a logic value equal to the inverse of the logic value stored within the programmable memory cell;
    a second NAND gate coupled to receive the clock gate control signal and the logic value stored within the programmable memory cell;
    an AND gate coupled to receive the input clock signal and an output signal from the first NAND gate;
    a first inverter coupled to receive an output signal from the second NAND gate;
    a NOR gate coupled to receive an output signal of the AND gate and an output signal of the first inverter; and
    a second inverter coupled to receive an output signal of the NOR gate, the second inverter thereby providing the output clock signal.

* * * * *